United States Patent
Ferlin et al.

(10) Patent No.: US 10,045,210 B2
(45) Date of Patent: Aug. 7, 2018

(54) METHOD, SERVER AND SYSTEM FOR AUTHENTICATION OF A PERSON

(75) Inventors: Benoît Charles Maurice Fernand Ferlin, Hallennes-lez-habourdin (FR); Alexis Rizet, L'abergement de Cuisery (FR); Peyman Aleboyeh, La plaine Saint Denis (FR)

(73) Assignee: ONEY BANK, Croix (FR)

( * ) Notice: Subject to any disclaimer, the term of this patent is extended or adjusted under 35 U.S.C. 154(b) by 794 days.

(21) Appl. No.: 13/997,932

(22) PCT Filed: Jun. 28, 2012

(86) PCT No.: PCT/FR2012/051495
§ 371 (c)(1),
(2), (4) Date: Feb. 25, 2014

(87) PCT Pub. No.: WO2013/021107
PCT Pub. Date: Feb. 14, 2013

(65) Prior Publication Data
US 2014/0227999 A1    Aug. 14, 2014

(30) Foreign Application Priority Data

Aug. 5, 2011 (FR) ..................... 11 57182

(51) Int. Cl.
*H04W 12/06* (2009.01)
*H04L 9/32* (2006.01)
*H04L 29/06* (2006.01)

(52) U.S. Cl.
CPC ........... *H04W 12/06* (2013.01); *H04L 9/3213* (2013.01); *H04L 9/3215* (2013.01);
(Continued)

(58) Field of Classification Search
CPC ....... H04L 63/083; H04L 63/10; H04L 63/08; H04L 65/1069; H04L 63/061;
(Continued)

(56) References Cited

U.S. PATENT DOCUMENTS

2003/0172272 A1* 9/2003 Ehlers ................ H04L 63/0853
713/170
2008/0086764 A1* 4/2008 Kulkarni ................ G06F 21/33
726/7

(Continued)

FOREIGN PATENT DOCUMENTS

WO    WO 2007/072001 A1    6/2007

*Primary Examiner* — George Eng
*Assistant Examiner* — Jing Gao
(74) *Attorney, Agent, or Firm* — Arent Fox LLP

(57) ABSTRACT

The invention relates to a method for authentication of a person previously known by a server to own a telephone having a unique identifier and to possess an access code, which method involves: the server sending (53) an identification code to a terminal on request by the latter via a first network; transferring (57) the identification code to the telephone; the server receiving (59), from the telephone via a second network, the identification code in association with the unique identifier; the server (61) generating a single-use authentication token and sending (63) the latter to the telephone; returning (64) the token to the server; and, in parallel: acquiring (67) via the terminal the access code input by the person; and sending (69) said access code to the server; authentication (71) of the person is obtained by the server if the identification code, the unique identifier, the authentication token and the access code correspond.

10 Claims, 2 Drawing Sheets

(52) U.S. Cl.
    CPC ........ *H04L 63/067* (2013.01); *H04L 63/0838* (2013.01); *H04L 63/18* (2013.01); *H04L 2209/56* (2013.01)

(58) Field of Classification Search
    CPC ............. H04L 63/0876; H04L 63/1441; H04L 2209/24; H04L 51/046; H04L 63/04; H04L 63/067; H04L 63/0815; H04L 63/0823; H04L 63/0869; H04L 63/105; H04L 67/303; H04L 67/306; H04L 63/0838; H04L 63/18; H04L 2209/56; H04L 9/3213; H04L 9/3215; H04W 12/06; G06F 21/31
    See application file for complete search history.

(56) References Cited

U.S. PATENT DOCUMENTS

| | | | |
|---|---|---|---|
| 2009/0217048 A1* | 8/2009 | Smith | H04L 63/06 713/176 |
| 2011/0016413 A1* | 1/2011 | Kalu | G06F 17/30879 715/763 |
| 2012/0028609 A1* | 2/2012 | Hruska | G06Q 20/3674 455/411 |
| 2012/0144461 A1* | 6/2012 | Rathbun | H04L 9/3213 726/5 |

* cited by examiner

METHOD, SERVER AND SYSTEM FOR AUTHENTICATION OF A PERSON

CROSS-REFERENCE TO RELATED APPLICATIONS

This application is a National Stage entry of International Application No. PCT/FR2012/051495, filed Jun. 28, 2012, which claims priority to French Patent Application No. 1157182, filed Aug. 5, 2011. The disclosures of the prior applications are hereby incorporated in their entirety by reference.

The present invention relates to a method, server and a system for authentication of a person owner of a telecommunications equipment having a unique identifier.

In numerous electronic transactions, for example payment ones, it is important to guarantee the identity of those involved and the secured transmission of confidential information between them.

The first solution that is put forward, and to this day widely used, consists in encrypting the transmission channel by a specific protocol, typically SSL "Secure Socket Layer".

This makes it possible to protect oneself from a wiretap over the transmission channel but this does not protect from attacks on the desktop such as the installation of a spyware or attack software of "Man in the Browser" type, that is to say, the integration of a malevolent spy software in the internet browser, nor from an attack software of "Man in the Middle" type wherein a third party poses as one of those involved and hacks into the communication channel by imitating the expected behavior of the point of contact.

Numerous solutions have been proposed to protect users from these types of attacks. Particularly, it has been put forward to use two different communication channels by assuming that it is very difficult for a third party to intercept and synchronize communications using two, or more, channels and thereby, the "Man in the Middle" attacks would hardly be possible anymore.

Based on this principle, a solution using two communication channels is the securing of electronic payment by bank card proposed by the VISA and Mastercard companies under the trade name "3D secure" or "Securecode" respectively. This service consists, after having entered one's bank card identifiers in receiving on one's mobile phone, registered beforehand, a single-use secret code which then must be copied onto the payment input screen.

The drawback of this solution is the fact of transiting the set of secret information, whereof the single-use secret code, by the terminal on which the payment transaction is carried out. Thus, a third party which intercepts internet communications is capable of playing with and modifying certain parameters of the transaction without the user noticing.

Document WO2007072001 describes for example another contactless payment method using a mobile phone as a secured payment means. It describes a 2-factor dynamic authentication using 3 apparatuses: an access terminal, the mobile phone of the buyer and an authentication sever. The method mainly consists in that:
  The user inputs his/her personal authentication data on the access terminal which sends it to the server with the information pertaining to the payment transaction (the "context");
  The server verifies his/her authentication data and, if they are valid, generates a message with a transaction identifier which it sends to the terminal;
  The terminal presents the transaction identifier in such a way that it be "captured" by the mobile phone;
  Based on this identifier which contains hidden information, the mobile phone decodes it and deduces the context of the transaction and the identification information in order to present them to the user for validation;
  If the user validates it, he/she inputs his/her authentication code in the terminal which sends it to the server for validation;
  After verifying this code, the server validates the transaction and authorizes the payment.

The drawback of this solution is that it is based on cryptographic techniques, particularly steganography, which are supposed to prevent a third party from "tampering with" the identifier of the transaction. However, if these cryptographic techniques are "broken", a third party can hack into the connection between the terminal and the server and recreate identifiers according to the needs. Particularly, this solution is based on a decryption software installed on the mobile phone. However, the security of information on these apparatuses is far from guaranteed.

Hence, it would be more advantageous to obtain an authentication method which would be robust with respect to these attacks and would not require cryptographic techniques that are difficult to implement or would not require a reinforcement of security of mobile phones.

In order to resolve one or several of the aforementioned drawbacks, a method for the authentication of a person, the person being previously known by an authentication server to own a telecommunications equipment having a unique identifier and to possess an access code, involving:
  the server receiving an authentication request from a terminal via a first data network;
  the server sending an identification code to the terminal by the first data network;
  transferring the identification code from the terminal to the telecommunications equipment;
  the server receiving, from the telecommunications equipment via a second data network, the identification code in association with the unique identifier;
  the server generating a single-use authentication token and sending the latter to the telecommunications equipment via the second data network; and returning the single-use authentication token to the server by the telecommunications equipment via the second data network; and in parallel,
  acquiring by the terminal, via an acquisition request, of the personal access code input by the person; and the server receiving the personal access code coming from the terminal via the first data network;
  authentication of the person by the server if the identification code, the unique identifier, the authentication token and the personal access code correspond to the elements detained by the server.

Thus, advantageously, each communication channel transports secret data of its own and the interception on one of the channels does not make it possible to know of secret data transiting on the other channel. This also protects from attacks linked to spy software installed in one of the terminals since there is a repartition of secret data thereto between the terminals.

Characteristics or particular embodiments, to be used alone or in combination, are:
  it further comprises a sub-method of enrolment of the person involving:
  the server receiving the unique identifier of the telecommunications equipment and at least a biographic data of the person from the telecommunications equipment via the second communication network;

the server sending a single-use password to the telecommunications equipment by the second communication network and display of the single-use password by the telecommunications equipment;

acquiring the single-use password on a second terminal by its input by the person;

the server receiving the single-use password from the second terminal via a third telecommunications network; and creating and sharing the personal access code between the person and the server via the second terminal and the third telecommunications network;

a confidential biographic data is transferred to the server from the second terminal via the third telecommunications network after reception of the single-use password by the server and before the creation of the personal access code;

the confidential biographic data comprises bank card data;

the enrolment sub-method further comprises, after creating and sharing the personal access code:

the server sending an identification code linked to the enrolment to the second terminal by the third data network;

transfer of the identification code from the terminal to the telecommunications equipment;

reception of the identification code in association with the unique identifier of the equipment by the server coming from the telecommunications equipment via the second data network;

the transfer of the identification code from the terminal to the telecommunications equipment is achieved by displaying a pictogram on the terminal and acquiring the displayed image by a photographic apparatus of the telecommunications equipment; and/or the telecommunications equipment intercepts the sending communication of the single-use authentication token and automatically returns it without the person intervening by using two different communication channels.

In a second aspect of the invention, a server for the authentication of a person comprises:

a memory for storing biographic information of the person, the biographic information comprising at least a unique identifier of a telecommunications equipment of which the person is the owner and a personal access code;

a first interface for communicating with a terminal via a first data network;

a second interface for communicating with the telecommunications equipment via a second data network;

a generator of identification code capable of generating an identification code upon request from the terminal and sending the generated identification code to the terminal and capable of receiving the identification code in association with the unique identifier coming from the telecommunications equipment;

a generator of single-use authentication tokens capable of generating a single-use authentication token and sending it to the telecommunications equipment and then receiving it from the telecommunications equipment;

an input application generator capable of sending the terminal a personal access code input screen and receiving the input personal access code from the terminal;

a comparator of identification code, of the unique identifier, of the authentication token, and of the personal access code coming from the terminal or the telecommunications equipment with the equivalent elements detained by the server, the authentication of the person being achieved if the set of comparisons is positive.

In a third aspect of the invention, an authentication system comprises an authentication server as the one above, a terminal connected to the server by a first communications network and a telecommunications equipment connected to the server by a second telecommunications network, the terminal further comprising a man-machine interface making it possible to display information and input a personal access code and the telecommunications equipment further comprising a means for inputting information displayed by the terminal and a unique identifier.

In a fourth aspect of the invention, a computer program product comprises instructions of program code for executing steps of the above method when the program is executed on an authentication server.

The invention will be better understood upon reading the following description, made by way of example only and with reference to the accompanying figs. in which.

Figure 1:
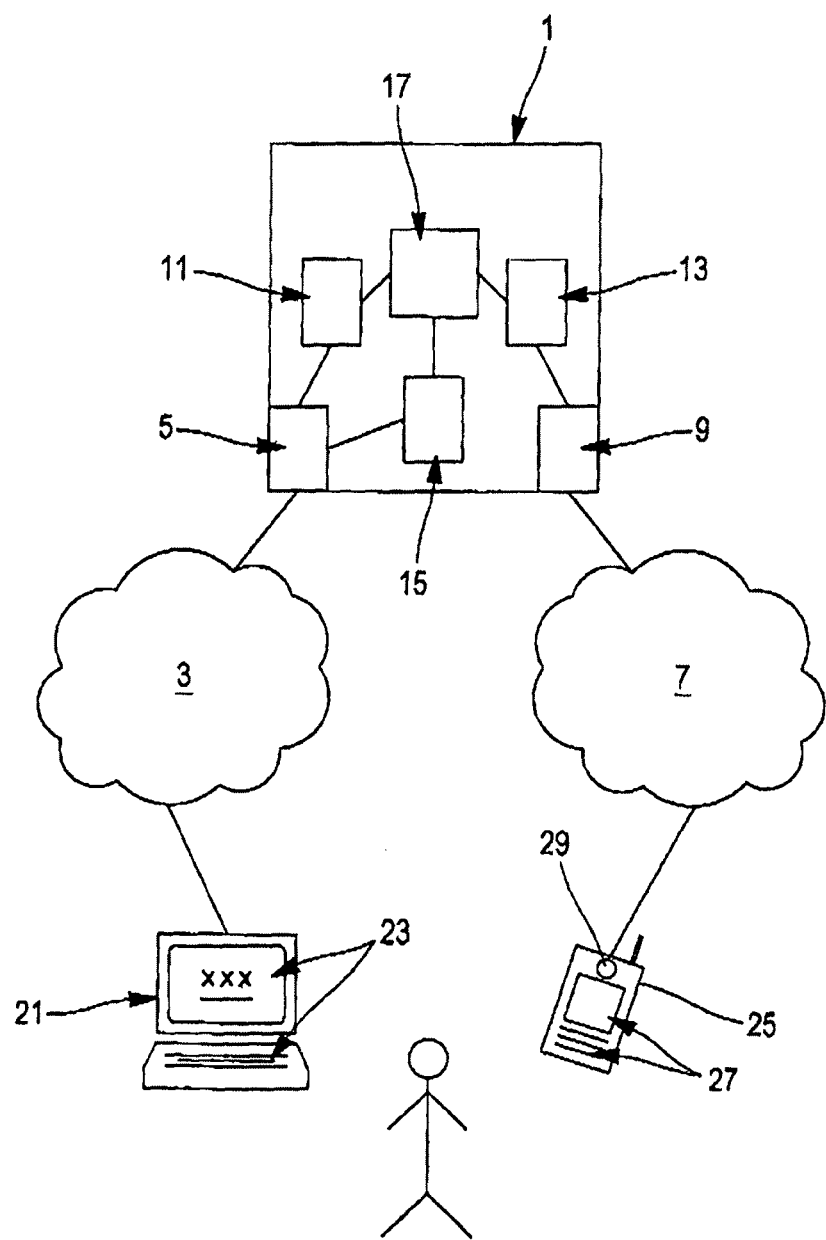
FIG. 1 is a schematic view of an authentication system according to an embodiment of the invention.

With reference to FIG. 1, an authentication system comprises an authentication server 1 connected to a first data network 3 via a first interface 5 and connected to a second data network 7 via a second interface 9.

The server also comprises a generator 11 of identification code adapted for generating an identification code and connected to the first interface 5. It also comprises a generator 13 of single-use authentication token adapted for generating a single-use authentication token and connected to the second interface 7.

The server 1 further comprises a generator 15 of input application which is also connected to the first interface 5 and a comparator 17 connected to each of the generators.

The first data network 3 makes it possible to create a first communication channel between the server 1 and a terminal 21. This terminal comprises a man-machine interface 23 such as, for example a screen and a keyboard. The terminal is for example a desktop computer or an electronic payment terminal.

The second data network 7 makes it possible to create a second communication channel between the server 1 and a telecommunications equipment 25. The equipment 25 is for example a mobile phone. It comprises a typical man-machine interface 27 of screen-keypad type and particularly a photo taking device 29. The mobile phone also typically comprises, computing and storage means (not represented) making it possible to execute particular applications.

The first data network 3 and the second data network 7 are distinct networks. For example, the first network 3 is a wired internet network and the second network 7 is a mobile phone network. At server 1, its manager can, for example, use two different access providers in order to minimize the probability that the data from one channel take up a part of the other channel.

Figure 2:
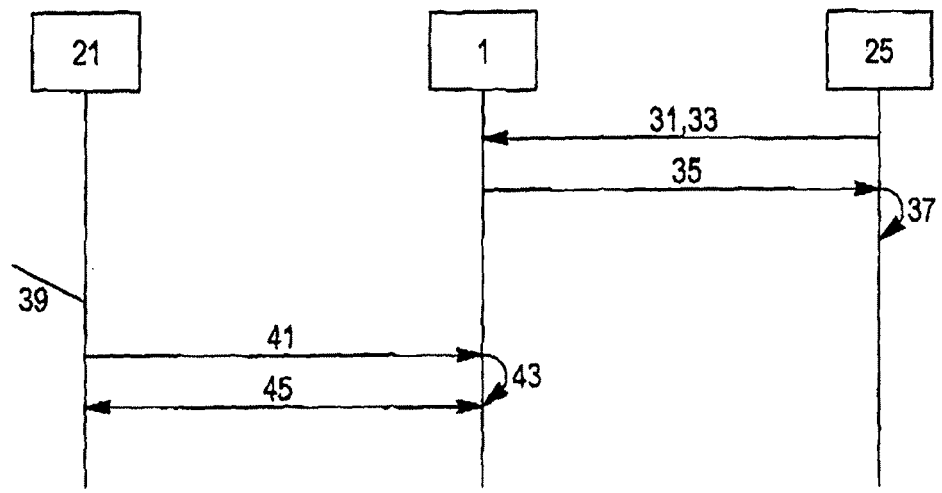
FIG. 2 is a flowgraph of the operation of the system in FIG. 1 in its enrolment phase, each element of the system being represented by a column.

The use of the system will now be described with reference to FIGS. 2 and 3.

In a sub-method, or phase, prior to the authentication of a user, the latter must enroll in the authentication server 1.

This enrolment phase will be described with reference to FIG. 2.

For the sake of clarity of the statement, it is supposed that the terminal 21 is a so-called "EPT" type electronic payment terminal and that the telecommunications equipment 25 is a mobile phone without this departing from the generality of the described method.

By using his/her mobile phone 25, the user connects, step 31, to the server 1 via the second network and provides, step 33, it with biographic data making it possible to identify him/her, for example his/her surname and name, address, etc.

He/she also provides identification information from his/her mobile phone 25. This information includes information pertaining to the terminal (for example the apparatus series number, the call number and the IMEI "International Mobile Equipment Identifier", etc.

In return, the server sends, step 35, a single-use password to the mobile phone 25 which the latter displays, step 37, on the screen. The password is thus, presented to the user in the form of an alphanumeric string, or even only numeric.

The user inputs, step 39, on the EPT 21 the single-use password displayed by the mobile phone 25.

The EPT 21 transmits, step 41, the single-use password to the server 1 via the first network 3. Upon reception, the server verifies, step 43 that the single-use password is correct, that is to say identical to that emitted on the mobile phone 25.

A personal access code is then created, step 45. This creation is either carried out by the server which then transmits the code to the user via the EPT 21, or by the fact that the user then inputs it on the EPT for transmission to the server.

The user is thus known by the server and shares a secret with it: the personal access code.

Figure 3:
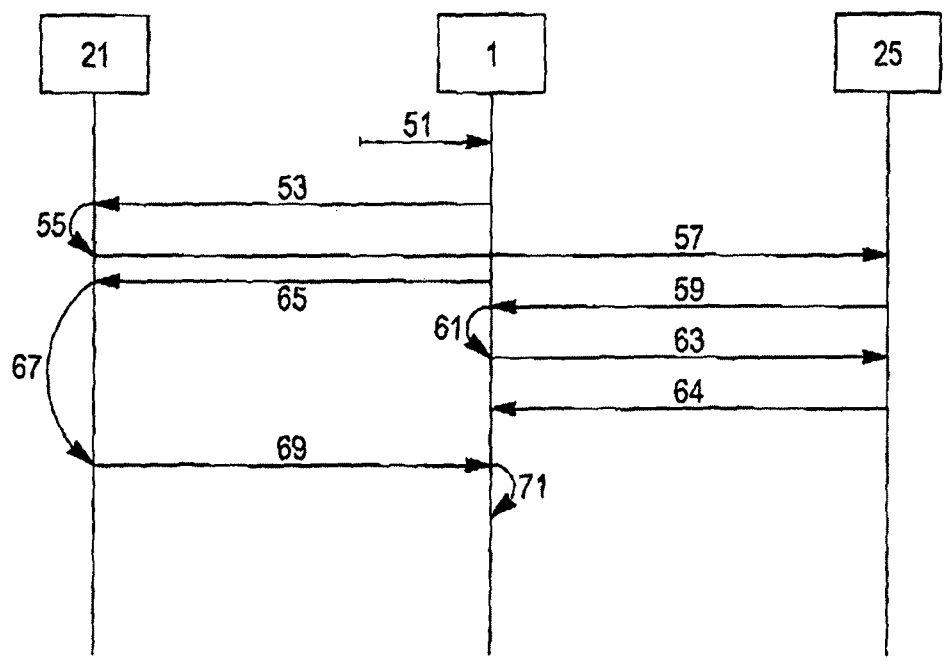
FIG. 3 is a flowgraph of operation of the system of FIG. 1 in its authentication phase, each element of the system being represented by a column.

The user being enrolled, he/she can then use the authentication system to authenticate himself/herself, FIG. 3.

In order to illustrate the authentication method, a secured electric payment operation will be described.

The user uses his/her personal computer to carry out a purchase on the internet. To simplify understanding, the set standard is that the personal computer is the terminal 21 connected to the first network 3. However, it is understood that the terminal 21 used during the enrolment phase may be and is, most often, different from the terminal 21 used during the authentication phase. Likewise, the first network 3 may be the same in both phases or may be different. The important point to be emphasized is that, during each phase, two distinct networks and two types of terminals are used simultaneously, one of the terminals being still the mobile phone 25 of the user which is registered during the enrolment, that is to say, an equipment which accompanies the user quasi permanently.

At the end of the purchasing process, the user is then taken to the payment page of the online store. The user selects the payment using the described authentication system.

The set of data pertaining to the transaction, often called "context" is then sent, step 51 to the authentication server with an authentication request.

The server 1 sends, step 53, an identification code of the transaction to the computer 21. This code is displayed, step 55, on the computer screen in the form of a pictogram. Typically, the code is displayed in the form of a 2D bar code, but it can also be displayed in the form of a typical bar code, or even in the form of a string of alphanumeric characters.

The displayed identification code is transferred, step 57, to the mobile phone 25. When the code is presented in the form of a bar code, this transfer is achieved by taking a photo, otherwise the user inputs the alphanumeric string on his/her phone keypad.

The identification code is then sent, step 59, to the server 1 by the mobile phone 25. It is worth noting that this authentication code does not enclose any secret, the transformation of the bar code into an alphanumerical identifier may be carried out on the mobile phone 25 or redirected to the server, the transmission thus, being carried out in the form of a photographic file. The identification code is sent, step 59 accompanied by the identifier of the mobile phone 25. This identifier must correspond to the identifier registered during the enrolment in order to make it possible for the server to verify that it is well and truly the mobile phone of the user that is being used.

Upon reception of the identification code, the server generates, step 61, a single-use authentication token and sends, step 63, the latter to the mobile phone 25. The latter returns, step 64, the single-use authentication token to the server 1. Advantageously, the channel used for one of the transmissions is different from the channel used for the other transmission. For example, the token is received via the "short message" channel and returned via the DATA TCP/IP channel on Wifi or 3G network. This step may be carried out without the intervention of the user since it is possible to program a telephone so that it intercepts a call before the ringtone and generates a communication in return. These transmissions may be achieved for example by using the short messages SMS. This step makes it possible to validate that it is well and truly the user mobile phone that has sent the identifier and not a third party trying to pose as the user.

In parallel, the server programs the computer 21 so that it displays, step 65, an acquisition request of the personal access code.

The user, then inputs, step 67, the personal access code which is transmitted, step 69 to the server 1.

The server 1, authenticates, step 71, the user if the identification code, the unique identifier, the authentication token and the personal access code correspond to the elements detained by the server.

Within the scope of the presented payment transaction, the authentication server thus launches the payment of the transaction.

In a first alternative of the enrolment, when the server 1 must serve for validating electronic payment operations, it is particularly advantageous that the user also provides the server 1 with data regarding his/her payment means, and particularly, data regarding a bank card. This step is achieved via the EPT 21, after the step 43 of single-use password validation, and preferably, before the step 45 of the personal access code creation. The authentication server may thus, during a payment transaction, use the bank card data to fulfill the payment.

In a second alternative of the enrolment, when the server 1 must authenticate the biographic data with a third party, the latter can be verified by using diverse known means known as such. For example, the verification of the identity can be carried out by providing an identity document such as an identity card, a passport or a driving license. These verified data may thus serve, for example, to validate the details of the purchaser with respect to the retailer. These validations may serve as authentication for the purchaser, without input of the personal access code, for material goods in as far as they guarantee that the delivery of the purchased goods will be carried out at the "validated" address of the purchaser.

In a third alternative of the enrolment, this phase follows the same steps as the authentication phase with, particularly, the use of a single-use authentication token which transits from the server to the telephone and back.

It is to be understood that the set of the method may be implemented in the form of an executed software, particularly, by server 1. This software, which is a set of instructions for piloting a computer may be stored in a medium allowing for its execution such as a hard disk or an optical disk. It may also be transmitted in the form of a downloadable file.

However, all or part of the method may be executed in the form of wired electronic circuits for achieving particular operations, for example in the FPGA form (Field Programmable Gate Arrays). This may be necessary for the sake of rapidity or for further security.

The invention has been illustrated and described in detail in the drawings and the previous description. The latter must be considered as illustrative and given by way of example and non-limiting for the invention to this sole description. Many alternatives of the embodiment are possible.

Thus, it is understood that the operations carried out by the telecommunications equipment are relatively simple, display of a code, taking photos, etc. and may hence be carried out by a standard mobile phone. However, the use of a programmable telephone makes it possible when using a specially adapted program to simplify the set of operations for the user.

The enrolment phase described advantageously makes it possible to reinforce the security of the data provided to the server. However it is independent from the authentication phase. Thus, the enrolment may be carried out by asking the user to come, with his/her mobile phone to a secure location, for example, a bank agency, in order to provide all the necessary documents: the information are then input by an agent on a secure terminal without executing the enrolment phase such as described above.

Likewise, the method and system have been described without the use of cryptographic techniques. These are not obligatory but can be advantageously used in order to reinforce the security of the set.

In the claims, the word "comprising" does not exclude other elements and the indefinite article "a" does not exclude a plurality.

The invention claimed is:

1. A method for authentication of a person, the person being known beforehand by an authentication server to own a telecommunications equipment having a unique identifier and being known as having a personal access code, the method comprising:
   the server receiving an authentication request from a terminal via a first data network;
   the server sending an identification code to the terminal by the first data network;
   transferring the identification code from the terminal to the telecommunications equipment, this transfer is achieved by the person inputting an alphanumeric string on the telecommunications equipment;
   the server receiving, from the telecommunications equipment via a second data network, the identification code in association with the unique identifier;
   the server generating a single-use authentication token and sending the single-use authentication token to the telecommunications equipment via the second data network; and returning the single-use authentication token to the server by the telecommunications equipment via the second data network;
   the server programming, in parallel with the server generating, the terminal to display an acquisition request of the personal access code then acquiring by the terminal, via the acquisition request of the personal access code input by the person; and the server receiving the personal access code coming from the terminal via the first data network;
   authentication of the person is obtained by the server if the identification code, the unique identifier, the authentication token and the personal access code correspond to elements detained by the server.

2. The method according to claim 1, characterized in that it further comprises a sub-method for enrolment of the person comprising:
   the server receiving the unique identifier of the telecommunications equipment and at least a biographic data of the person from the telecommunications equipment via the second data network;
   the server sending a single-use password to the telecommunications equipment by the second data network and display of the single-use password by the telecommunications equipment;
   acquiring the single-use password on a second terminal by its input by the person;
   the server receiving the single use password from the second terminal via a third data network; creating and sharing the personal access code between the person and the server via the second terminal;
   and the third data network.

3. The method according to claim 2, characterized in that a confidential biographic data is transferred to the server by the second terminal via the third data network after reception of the single-use password by the server and before the creation of the personal access code.

4. The method according to claim 3, characterized in that the confidential biographic data comprises bank card data.

5. The method according to claim 2, characterized in that the enrolment sub-method further comprises, after the creation and sharing of the personal access code:
   the server sending an identification code linked to the enrolment to the second terminal by the third data network;
   transfer of the identification code from the terminal to the telecommunications equipment;
   reception of the identification code in association with the unique identifier of the telecommunications equipment by the server coming from the telecommunications equipment via the second data network.

6. The method according to claim 1, characterized in that the transfer of the identification code from the terminal to the telecommunications equipment is achieved by displaying a pictogram on the terminal, and acquiring the displayed pictogram by a photographic apparatus of the telecommunications equipment.

7. The method according to claim 1, characterized in that the telecommunications equipment intercepts the sending of the single use authentication token and automatically returns it without the person intervening by using two different communication channels.

8. A person authentication server for execution of steps of the method according to claim 1, the server comprising:
   a memory for storing biographic information of the person, the biographic information comprising at least the unique identifier of the telecommunications equipment which the person owns and the personal access code;

a first interface for communicating with the terminal via the first data network; a second interface for communicating with the telecommunications equipment via the second data network;

a generator of identification codes capable of generating the identification code upon request of the terminal and sending the generated identification code to the terminal and receiving the identification code in association with the unique identifier coming from the telecommunications equipment;

a generator of single-use authentication tokens capable of generating the single-use authentication token and sending it to the telecommunications equipment and then receiving it from the telecommunications equipment;

a input application generator capable of sending the terminal a personal access code input screen and receiving the input personal access code from the terminal;

a comparator of the identification code, the unique identifier, the authentication token, and the personal access code coming from the terminal or from the telecommunications equipment with equivalent elements detained by the server, the authentication of the person being achieved if comparisons of the identification code, the unique identifier, the authentication token, and the personal access code are positive.

9. An authentication system comprising the authentication server according to claim 8, the terminal connected to the server by the first data network and the telecommunications equipment connected to the server by the second data network, the terminal further comprising a man-machine interface making it possible to display information and input the personal access code and the telecommunications equipment further comprising a means for inputting information displayed by the terminal and the unique identifier.

10. A computer program product embedded on non-transitory medium comprising instructions of program code for executing steps of the method according to claim 1 when the program is executed on an authentication server.

* * * * *